May 13, 1958     E. K. NICKERSON     2,834,569
PISTON ACTUATED VALVE WITH RESTRAINING DETENT
Filed Nov. 16, 1955
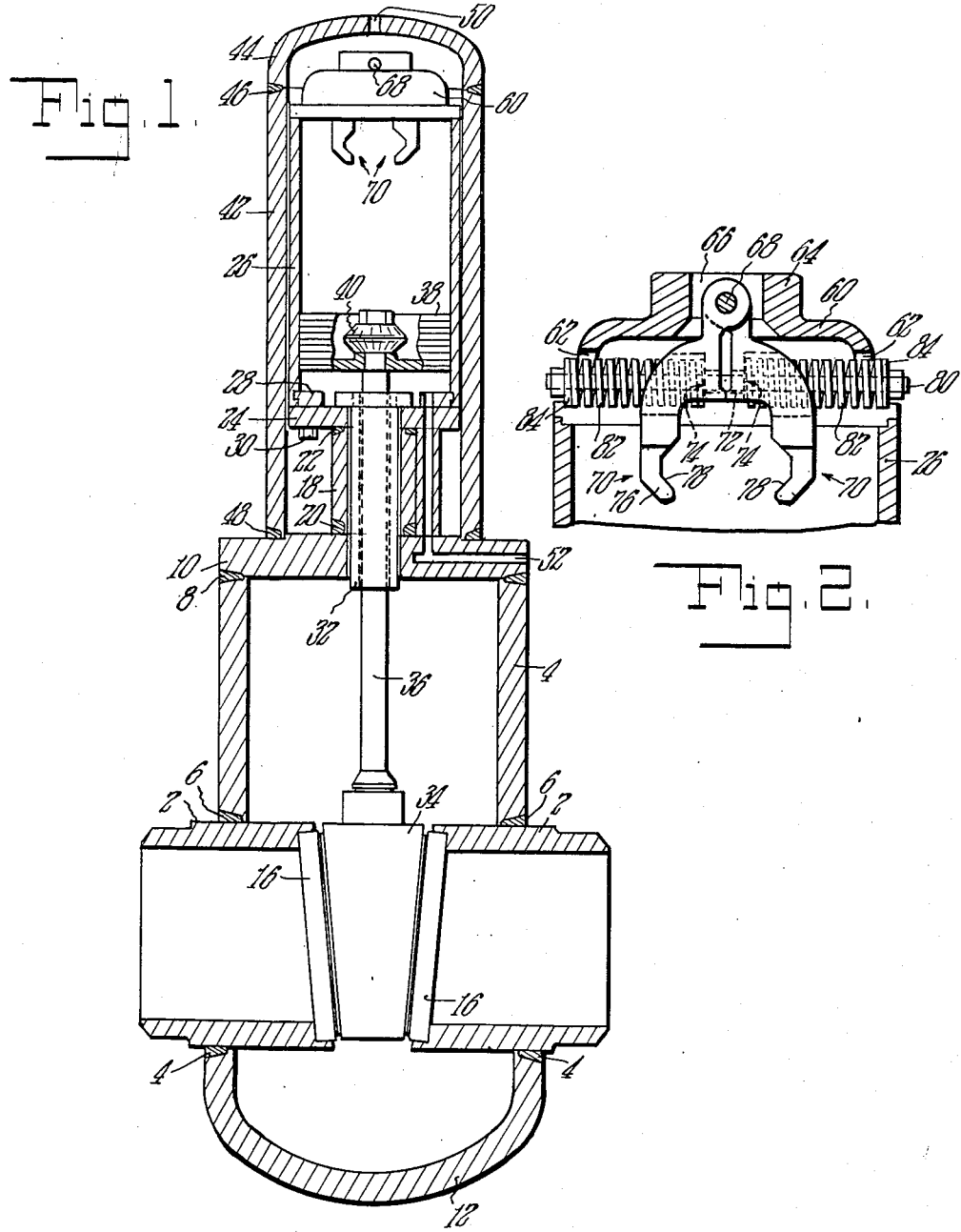
INVENTOR.
Elmer K. Nickerson
BY Ross-Ross, Attys.

This invention relates to new and useful improvements in valves and is directed more particularly to valves of the type shown and described in the patent to Nickerson, No. 2,638,124, issued May 12, 1953.

United States Patent Office 2,834,569
Patented May 13, 1958

2,834,569

PISTON ACTUATED VALVE WITH RESTRAINING DETENT

Elmer K. Nickerson, deceased, late of Springfield, Mass., by Martha N. Steele, administratrix, West Haven, Conn., assignor to Chapman Valve and Manufacturing Company Application November 16, 1955, Serial No. 547,195

1 Claim. (Cl. 251—62)

This invention relates to new and useful improvements in valves and is directed more particularly to valves of the type shown and described in the patent to Nickerson, No. 2,638,124, issued May 12, 1953.

The principal object of the invention is directed to the provision, in a valve of the type referred to, of means for releasably retaining the piston thereof in its uppermost position, thereby holding the disc in its open position.

It is necessary and desirable that the valve disc remain in the full open position during open periods of the valve. The disc is moved to its open position by pressure applied to the disc side of the piston.

It may be desired to close off pressure acting on the piston, in which case, pressure may leak past the piston or the pressure supplying means may become disrupted. Due to these or other causes, or possibly due to jarring of the valve, as is likely to occur on ships for instance, the piston tends to drift back to the closed position of the disc, all of which is obviously objectionable.

According to the novel features of this invention, means is provided to releasably retain the piston in the open position of the disc until actuating pressure is applied to the piston for the closed position of the disc. In this way, objectionable drifting of the piston and disc is obviated.

All of the above cited objects, I accomplish by means of such structure and relative arrangement of parts thereof, as will fully appear by a perusal of the description below and by various specific features which will be hereinafter set forth.

To these above and other ends, various other and ancillary features and advantages and objects of my invention will become more readily apparent as the description proceeds. My invention consists in certain features of novelty, in a mode of operation, and in the combination, organization, and arrangement of parts as will be hereinafter more particularly pointed out in the claim hereunto annexed and more fully described and referred to in conjunction with the accompanying drawings wherein:

Fig. 1 is a longitudinal sectional elevational view through a valve structure embodying the novel features of the invention, and Fig. 2 is a transverse sectional view through the clamp arm bracket and upper portion of the cylinder.

Referring to the drawings more in detail, the novel features of the invention will be fully described.

The body of the valve, shown in Fig. 1, includes lower tubular end members 2, and an upper tubular member 4 welded, as at 6, at its lower end, to the end members 2, and welded, as at 8, at its upper end, to a plate 10. A hollow semi-spherical member 12 is welded at 14 to each of the end members 2. Seat rings of usual form 16 are carried by the inner ends of each of the end members 2. An elongated bonnet 18 is welded at its lower end to the upper side of the plate 10, as at 20. The upper end of said member 18 is welded, as at 22, to the underside of a plate 24.

A cylinder 26, at its lower end, is engaged with a ring 28 which is secured to the plate 24, as by bolts, such as 30. An elongated tubular sleeve 32 is provided which, at its upper end, is secured in some suitable manner to plate 24, as by bolts, not shown. A disc 34 is shown in closed seated position between the seat rings 16 and an elongated spindle 36 connected at its lower end to the disc extends rather loosely through the sleeve 32 and has secured to its upper end a piston 38 and head 40.

A cover 42, having a cap 44 welded at 46 to its upper end, is welded at its lower end to the plate 10, as at 48. The cover 42 is preferably out of contact with the cylinder, as shown.

It will be noted that the parts are welded together, to provide an integral structure with the disc operating components therewithin.

Passageways 50 and 52 are provided for pressure from a suitable source, as in the patent referred to. Pressure at passageway 52 acts on the piston to elevate it and to move the disc 34 from the closed position shown, to its open position. Pressure at passageway 50 acts on the piston for moving the disc to its closed position.

It is desirable and necessary, during open periods of the valve, that the disc be maintained in its full open position wherein the piston is at the upper end of the cylinder. Pressure against the underside of the piston may be interrupted or pressure may leak past the piston and its rings so that the piston and thereby the disc may drift from full open position which is objectionable. Means is provided to releasably retain the piston in full open position of the disc.

A clamp bracket 60 is secured to the open end of the cylinder and has openings 62 on opposite sides thereof. Said bracket may be secured to the cylinder in any well known manner, as by welding. A hub 64 on the upper side of the bracket 60 is provided with a vertically extending opening 66 across which extends a pin 68.

A pair of similar clamp arms 70 are pivoted on the pin 68 and are provided with openings such as 72, and with shoulders 74. Lower ends of the arms are provided with prongs 76 having inner surfaces 78 which are complemental to the underside of the head 40 which is secured to the upper end of the spindle 36.

A rod 80 extends through the openings 72 of the arms 70 and springs 82 around said rod bear on the shoulders 74 of said arms. Washers 84 on the outer ends of the rod 80 are held in place by nuts 86 threaded on the ends of the rod. The springs 82 urge the arms towards one another and resist relative movements thereof.

As the piston moves to its upper position and to the open position of the disc, the upper side of the head 40 engages and cams the clamp arms 70 apart against the action of the springs and, as the piston reaches its uppermost position, the springs urge the clamp arms inwardly. The inner surfaces 78 of the clamp arms 70 engage the lower angular underside of the head 40. The parts are so arranged that the spindle and thereby the disc are releasably held in the full open position of the disc.

However, as a certain pressure is exerted against the upper side of the piston, the springs are such that the clamp arms yield and release the head for downward movement of the piston so that the disc may assume its closed position.

While I have illustrated and described the invention as embodied in a specific arrangement, I do not intend to be limited to the details shown since various modifications and structural changes may be made without departing in any way from the spirit of the invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the claim below.

What it is desired to claim and secure by Letters Patent of the United States is:

In a valve construction including a cylinder being closed at its upper end and having a reciprocable piston disposed therein and connected to a valve disc, the improvement consisting of, a head disposed on the upper side of the piston and having a lower surface diverging outwardly and upwardly from the piston to an enlarged intermediate portion and an upper surface converging inwardly and upwardly from the intermediate portion, a pair of arms having a pivotal connection on the upper end of the cylinder and having lower free ends depending therefrom and being swingable between closed head-embracing and open head-releasing positions, lower ends of said arms having surfaces formed for engagement by the upper surface of said head as the piston approaches its upper open position, said arms being arranged to releasably embrace and hold said head in the upper open position of the piston, means including a rod extending through said arms and compression springs on said rod acting on the outer sides of said arms urging said arms to closed position, said pivotal connection being disposed on an axis transverse to the axis of movement of the piston.

References Cited in the file of this patent

UNITED STATES PATENTS

| | | |
|---|---|---|
| 1,480,942 | McKee | Jan. 15, 1924 |
| 1,892,344 | Huber | Dec. 27, 1932 |
| 1,905,077 | Walker | Apr. 25, 1933 |
| 2,010,500 | Smith | Aug. 6, 1935 |
| 2,387,792 | Holmes | Oct. 30, 1945 |
| 2,638,124 | Nickerson | May 12, 1953 |

FOREIGN PATENTS

| | | |
|---|---|---|
| 614,643 | Germany | June 13, 1935 |
| 850,505 | Germany | Sept. 25, 1952 |